R. G. W. ACKERMAN.
SPEED REGULATOR ATTACHMENT FOR CAMERAS.
APPLICATION FILED JUNE 19, 1915.
1,185,360.
Patented May 30, 1916.
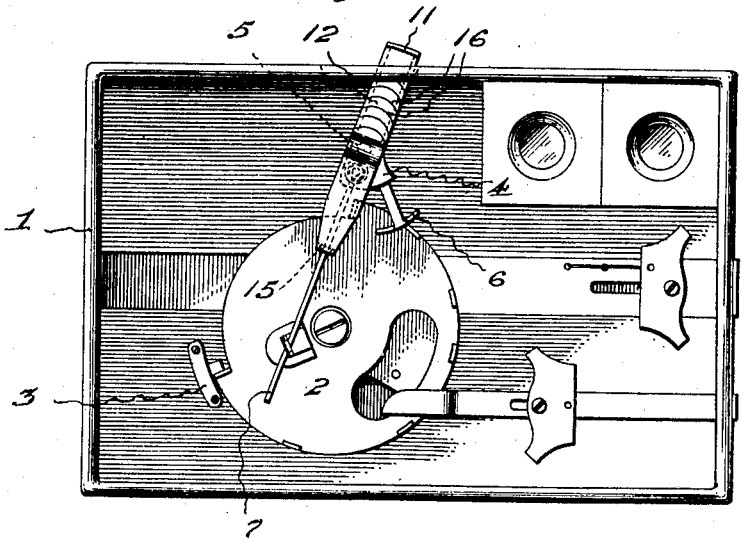
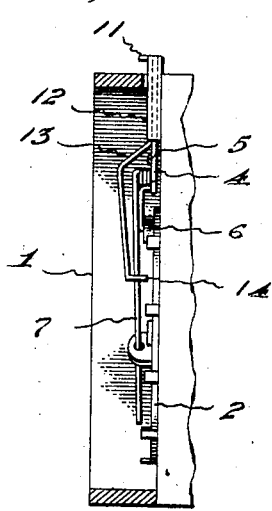
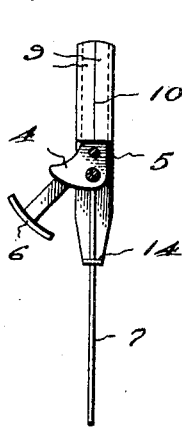
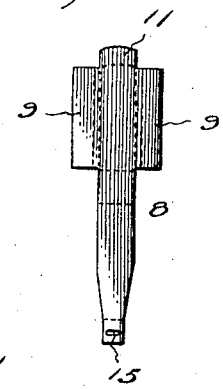
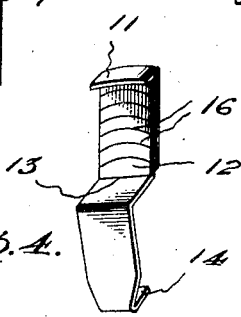

UNITED STATES PATENT OFFICE.

ROBERT G. W. ACKERMAN, OF NEW YORK, N. Y.

SPEED-REGULATOR ATTACHMENT FOR CAMERAS.

1,185,360.  Specification of Letters Patent.  Patented May 30, 1916.

Application filed June 19, 1915. Serial No. 35,105.

*To all whom it may concern:*

Be it known that I, ROBERT G. W. ACKERMAN, a citizen of the United States, residing at New York, county of Bronx, and State of New York, have invented certain new and useful Improvements in Speed-Regulator Attachments for Cameras, of which the following is a specification.

This invention relates to speed regulator attachments for cameras.

Box cameras, particularly those of moderate price, are usually fitted with an oscillatory shutter which is opened and closed by a pivoted controller and a spring wire connecting the lever to the shutter. Usually these shutters and operating means are only adapted for instantaneous exposure at one speed.

My invention has for its object the provision of a speed regulator attachment which can be applied to and combined with the operating member or lever of any ordinary oscillatory shutter, particularly such as are used on box cameras of moderate price, whereby the effective length of the spring or spring wire which connects the usual operating lever to the shutter may be varied at will by the user of the camera to thereby provide means for regulating at will the speed with which the shutter will operate, and further, providing for instantaneous exposures, time exposures or exposures at any desired speed.

A further object is to provide, in an attachment such as heretofore set forth, indicating means constituting a speed scale by which the operator can predetermine the speed at which he desires the shutter to operate.

My invention is not to be confused with those devices heretofore commonly employed for connecting the spring wire to the shutter itself, admitting of relative adjustment. Such devices are not conveniently exposed and adapted to be set and quickly changed by the user of the camera, but are for effecting a permanent adjustment.

My invention contemplates the provision of a supplemental speed regulator applied to the operating lever or finger-piece and to the spring and capable of adjustment at will by the operator at the time of making the exposure.

Preferably, the invention will be applied to the shutter operating means by the manufacturer, but my invention is not limited to such application, as it may be applied to the shutter operating means by the user of the camera or anyone.

The invention consists, first, in a speed regulator attachment for the lever of a shutter operating mechanism, as will more fully appear hereinafter; second, in the combination with the shutter operating lever and spring wire, of a speed regulator combined with the lever and spring and adapted to be moved to regulate the effective portion of the spring and, more particularly, in a speed regulator attachment which is slidably mounted on the shutter operating lever and has a slidable engagement with the shutter operating spring wire, whereby the point of application of the power imparted to the shutter operating lever may be changed to different points of the length of the spring wire that controls the snapping of the shutter.

The invention consists, still further, in the provision of a scale or indicating means on the speed regulating attachment, enabling the user to predetermine the speed at which the shutter will operate.

The practical embodiment which is set forth hereinafter and shown in the accompanying drawings is to be considered as illustrative, rather than restrictive, of the scope of the invention, as my invention is susceptible of modification.

In the accompanying drawings: Figure 1 is a front view showing the invention combined with an ordinary oscillatory shutter and its operating lever; Fig. 2, a side view thereof; Fig. 3, a rear view; Fig. 4, a detail perspective of the attachment alone; and Fig. 5, a view of the blank from which the attachment is formed.

Referring to Figs. 1 and 2, the invention is shown applied to an ordinary type of oscillatory shutter and operating lever such as are commonly employed on moderate priced box cameras. It is to be understood, however, that the invention is adapted for use in connection with any camera shutter and shutter operating lever where the shutter is snapped by the flexing of a spring wire or spring interposed between the operating lever and the shutter. A portion of the camera box is shown at 1; the oscillatory shutter at 2, the stationary stop at 3, the usual operating lever or finger-piece at 4, which is pivoted at 5, and coöperates with the shutter at 6. The spring wire which connects the lever 5 to the shutter 2, is shown at 7. As thus far described, the parts are old and well known.

My invention is constructed, preferably by stamping, from thin sheet metal, preferably brass or composition, on account of their strength and non-rusting qualities, of a gage which may be determined by the camera manufacturer according to the resistance of the spring operating the shutter 2.

Referring to Fig. 5, I have shown the blank 8 from which the speed regulating attachment shown in the remaining figures may be constructed. The blank is provided with parts 9 which are adapted to fold around the lever 4 and to meet, or nearly so, along the line 10. The outer end of the attachment which protrudes at the top or side of the camera is preferably bent or pressed laterally as at 11 to constitute a finger-grip. The parts 9 and the front portion 12 constitute a shell or hollow envelop which loosely embraces the lever 4 beyond the pivot 5 and is slidably mounted thereon for adjustment longitudinally thereof. The remaining portion of the attachment is bent outwardly at 13 to clear the balance of the operating lever 4 and has an inturned lip 14 provided with an elongated aperture 15 which loosely receives the spring wire 7. The greater length of the opening 15 is parallel to the plane of the shutter 2. The opening is elongated to allow a slight play of the spring therein and to prevent binding. The speeds and variation of same can best be determined by the manufacturer, but as different speeds are determined for different sized cameras, the variations can be noted on the front 12 at the time the attachment is stamped, by providing curved lines 16 constituting a scale, each line denoting a particular speed. The relation of these lines to the outer end of the operating lever 4 enables the user of the camera to determine the speed at which he desires the shutter to operate. The engagement of the attachment with the lever 4, while loose enough to permit any relative adjustment desired, is sufficiently tight so that the attachment will retain itself, by friction, wherever it is positioned. Assuming that the attachment is in the lowest position possible, which is that shown in Fig. 1, the shutter will move at the fast speed, because the effective length of the spring wire 7 is only that comprehended between the lip 11 and the point where the spring wire is connected to the shutter. To make an instantaneous exposure of slower speed, the attachment is grasped and pulled out to the desired point. The farther it is pulled out, the slower will be the speed of the shutter because the effective length of the spring wire 7 is increased, which allows for greater flexibility. In making time exposures, the attachment can be used in the same way.

Having thus described my invention, what I claim as new and desire to secure by Letters Patent, is:—

1. As a new article of manufacture, a speed regulator attachment for cameras comprising a member having means adapted for adjustable connection to the shutter operating lever of the camera and also provided with a part adapted for adjustable engagement with the shutter operating spring.

2. As a new article of manufacture, a speed regulator attachment for cameras comprising a member having a sheath adapted to adjustably embrace the shutter operating lever of the camera and also provided with a part adapted for adjustable engagement with the shutter operating spring.

3. As a new article of manufacture, a speed regulator attachment for cameras comprising a member having means adapted for adjustable connection to the shutter operating lever of the camera and provided with a speed scale, said member also having a part adapted for adjustable engagement with the shutter operating spring.

4. As a new article of manufacture, a speed regulator attachment for cameras comprising a handle portion of sheath-like form provided with a finger-grip and with a speed scale, said handle portion being adapted for slidable connection to the shutter operating lever, said attachment also having a portion provided with a slotted lip adapted to receive the shutter operating spring.

5. The combination with the shutter operating lever, shutter, and spring wire connecting them, of a speed regulator attachment carried by said lever and having an adjustable connection to said spring.

6. The combination with the shutter operating lever, shutter, and spring wire connecting them, of an adjustable attachment therefor for regulating the effective operating length of said spring.

7. The combination with the shutter operating lever, shutter, and spring wire connecting them, of a speed regulator attachment adjustably connected to both the lever and spring whereby the effective operating length of said spring may be varied.

8. The combination with the shutter operating lever, shutter, and spring wire connecting them, of a speed regulator attachment comprising a sheath slidable on the lever and a slotted part which is engageable with the spring at different points thereof.

9. The combination with the shutter operating lever, shutter, and spring wire connecting them, of a speed regulator attachment comprising a sheath having a speed scale and slidable on the lever, and a part engageable with the spring at different points thereof.

In testimony whereof, I hereunto affix my signature in presence of two witnesses.

ROBERT G. W. ACKERMAN.

Witnesses:
WM. J. SCHAPPERT,
FREDK. E. KINNER.